F. M. JACOBS, DEC'D.
H. JACOBS, ADMINISTRATOR.
FIRE BOX FOR BOILERS.
APPLICATION FILED DEC. 27, 1913.

1,125,106.

Patented Jan. 19, 1915.
6 SHEETS—SHEET 6.

Fig. 6.

UNITED STATES PATENT OFFICE.

FRANK M. JACOBS, DECEASED, LATE OF ATCHISON, KANSAS, BY HENRY JACOBS, ADMINISTRATOR, OF ATCHISON, KANSAS.

FIRE-BOX FOR BOILERS.

1,125,106.

Specification of Letters Patent.

Patented Jan. 19, 1915.

Application filed December 27, 1913. Serial No. 809,058.

*To all whom it may concern:*

Be it known that I, HENRY JACOBS, a citizen of the United States, and a resident of Atchison, in the county of Atchison and State of Kansas, am the administrator of the estate of FRANK M. JACOBS, deceased, late a citizen of the United States and resident of Atchison, Kansas, who invented certain new and useful Improvements in Fire-Boxes for Boilers, of which the following is a description, reference being had to the accompanying drawings, which form a part of the specification.

The invention, as shown in the exemplifications, relates more particularly to fire-boxes for the locomotive type of boilers, it being understood, however, that certain features of the invention may be embodied in boilers of other types.

One object of the invention is to materially increase the heating surface of the fire-box in an effective manner, which is accomplished by providing a heating surface in and around the combustion chamber, composed of water tubes arranged to constitute the side walls of the fire-box or combustion chamber, instead of the usual stayed side and crown sheets.

Another object of the invention is to provide a simple, efficient, and inexpensive fire-box, preferably of the locomotive type, wherein the water tubes, constituting the side walls of the fire-box or combustion chamber, connect with a hollow mud-ring or header at the bottom of the fire-box or combustion chamber and with a plurality of suitable drums or chambers at the top, substantially as and in the manner illustrated in the drawings.

The invention contemplates a material increase of the heating surface through an arrangement of the water tubes whereby the combustion chamber is divided into two compartments by an intervening wall or partition composed of water tubes, so arranged, however, as not to materially decrease the grate area, but greatly increasing the heating surface exposed to the hot gases of combustion; the invention contemplating an arrangement of the water tubes or heating surfaces so as not to interfere with or baffle the hot gases in their passages through the fire flues of the boiler.

A further object of the invention is the provision of a non-explosive fire-box which may be readily applied to any ordinary existing locomotive boiler by the mere replacement of the present type of fire-box.

A further object of the invention is to greatly eliminate the difficulty of staying the fire-box and shell sheets of the ordinary fire-box by replacing them with water tubes and drums or headers at the top and with a heavy, hollow mud-ring at the bottom.

These various advantages, as well as others, will more readily be apparent from the following detailed description of the accompanying drawings, wherein:—

Figure 1:
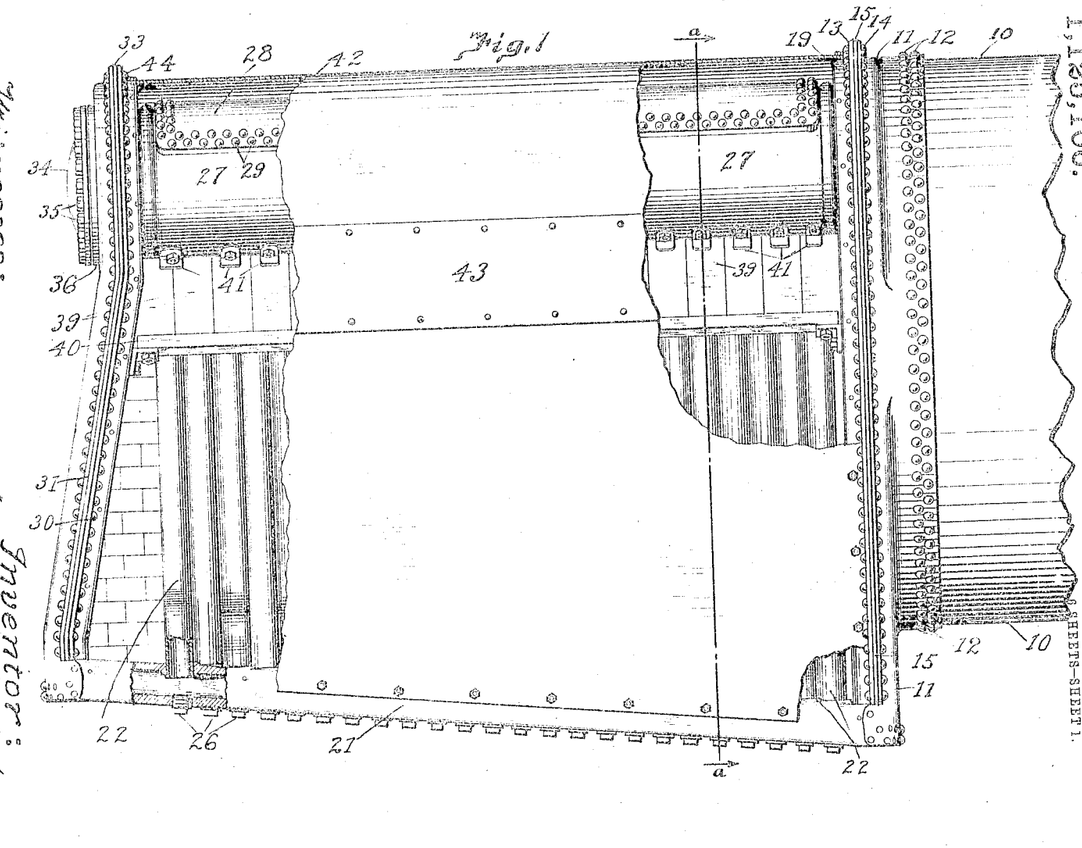
Figure 1 is a longitudinal view of a fire-box embodying the invention, with portions of the shell wrapper removed to more clearly illustrate the tubular construction within, and with a portion of the mud-ring or header shown in section.
Figure 2:
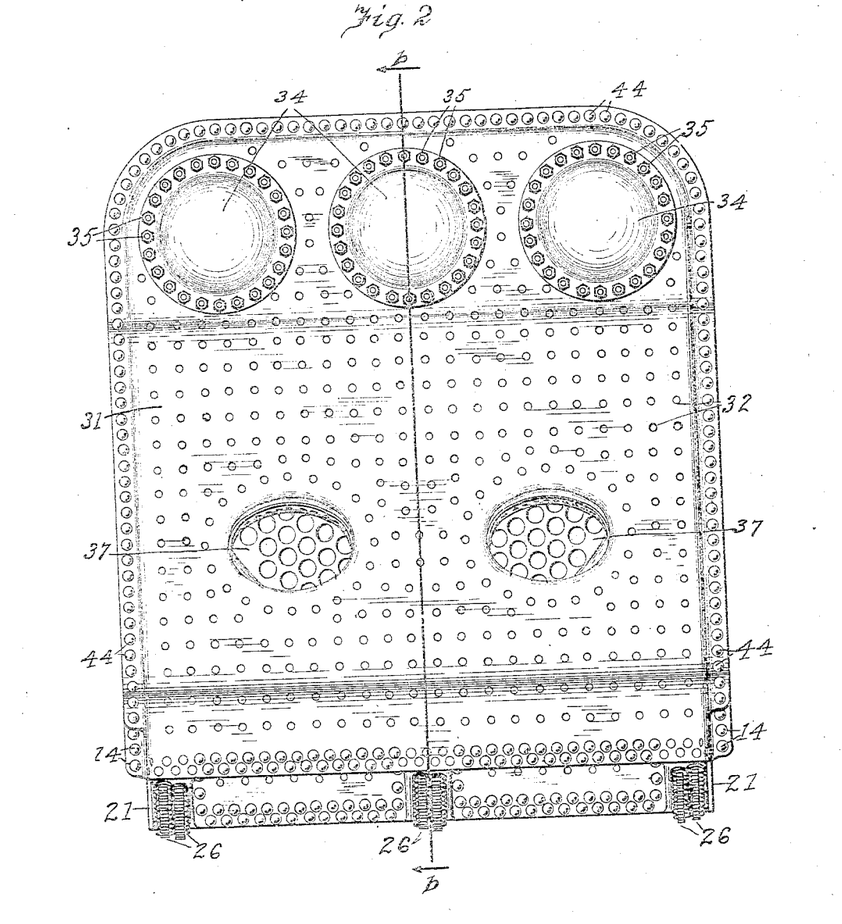
Fig. 2 is an end elevation of the back head of the fire-box illustrated in Fig. 1 and showing the location of the fire-doors and removable heads which register with the top drums or headers forming part of the crown or top of the fire-box.
Figure 3:
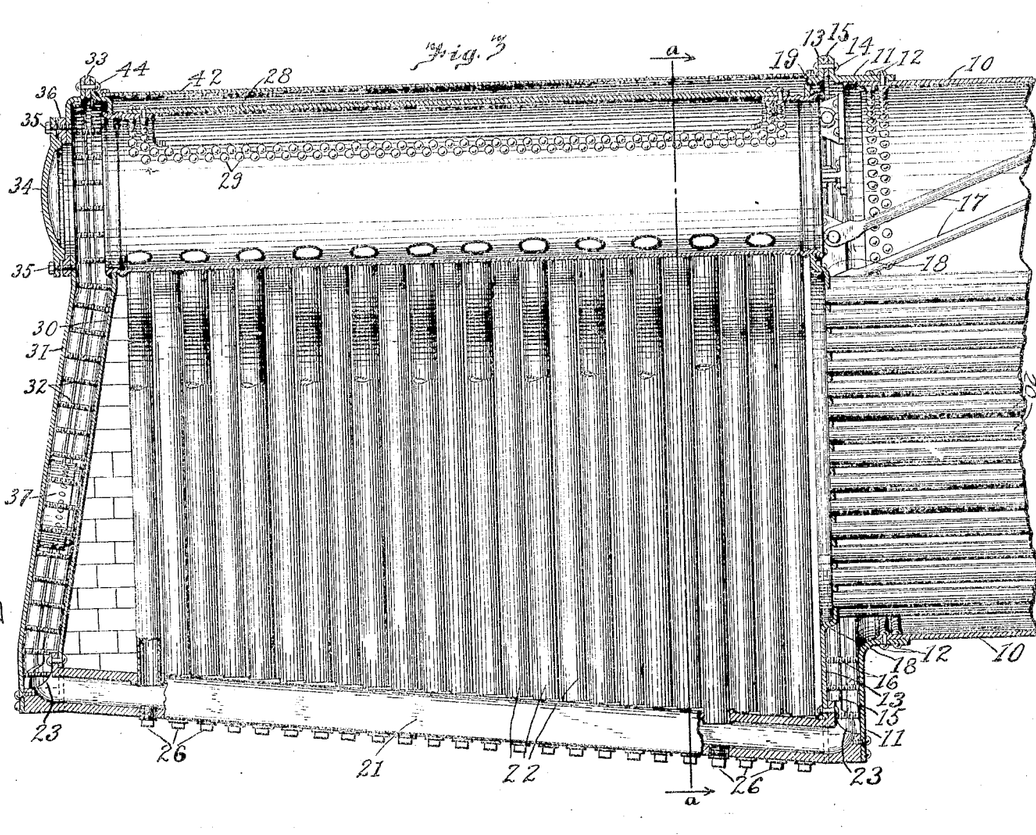
Fig. 3 is a longitudinal sectional view taken on the line $b$—$b$ of Figs. 2 and 4, looking in the direction of the arrows, illustrating the detailed construction of the middle section of the hollow mud-ring or bottom header and its connections with the central top drum of the header.
Figure 4:
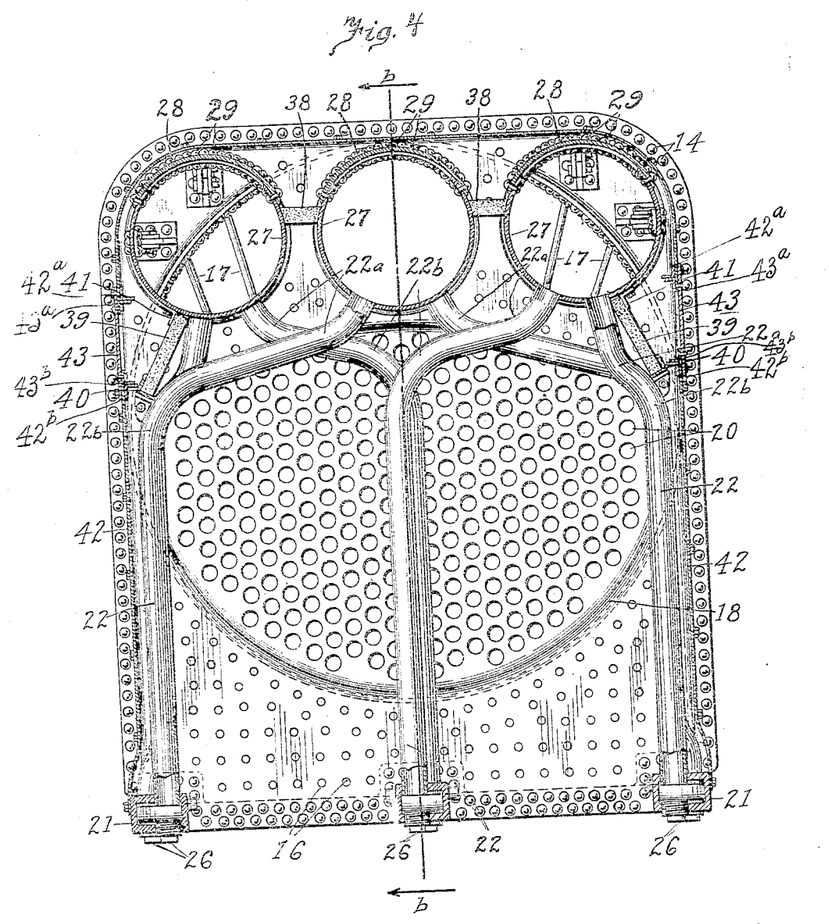
Fig. 4 is a vertical sectional view taken on the line $a$—$a$ of Figs. 1 and 3, looking in the direction of the arrows, and more clearly illustrating the tubular connections between the partly hollow mud-ring which forms the bottom headers and the top drums or headers; this figure clearly showing the free circulation of the water afforded by the front and back heads of the fire-box.

In the exemplification of the invention as illustrated in Figs. 1 and 3, only a portion of the cylindrical barrel or shell 10 of the boiler is shown, which shell is secured to a one-piece throat sheet 11. The throat sheet is preferably constructed as shown, but the same may be slightly altered to fit the cylindrical boiler shell when the improved fire-box herein shown and described is intended to replace the ordinary type of fire-box on a locomotive boiler. As clearly shown in the drawings, the throat sheet 11 is secured preferably by the rivets 12, see Figs. 1 and 3, to the boiler shell 10, and to the front head and flue sheet 13 by the rivets 14. In order that the rivet seam may be easily calked tight at any time, a calking strip 15 is provided between the throat sheet 11 and the flue sheet 13. The flat surfaces of the throat sheet and flue sheet are stayed to each other by means of the stay bolts 16, where oppositely disposed surfaces are presented; and by anchor sling stays 17 where but one sheet requires support, as very clearly shown in Fig. 3. The flue sheet and front head 13 is provided with an off-set 18, around the flue or fire tube face, and with an off-set 19 around the extreme perimeter, in order to reduce and compensate any internal strain that may be set up in the sheet due to any unequal expansion or contraction on account of the varied temperatures to which the different sections of the sheet are subjected. This feature of the construction is more clearly illustrated in Fig. 3. The flues or fire-tubes 20 of the boiler may be secured in the flue sheet 13 in any suitable manner; it is preferred, however, to weld them integrally together, either autogenously or electrically, as this method of securing the flues to the flue sheet has been proven very advantageous where the parts are exposed to the intensely hot gases. The mud-ring 21, which is preferably a steel casting in the nature of a hollowed rectangular frame having a central longitudinal portion, as very clearly shown in Fig. 5, has its longitudinal section cast hollow to form the bottom header for the water tubes 22, which latter form the side and central walls of the fire-box, as illustrated in the first figures of the drawings; the ends or transverse sections of the mud-ring are cast solid with the exception of the openings 23, which communicate with the hollow chambers of the longitudinal sections and with the water legs. The top surfaces of the longitudinal hollow walls of the mud-ring 21 are provided with suitable openings or holes 24, see Fig. 5, through which the water tubes 22 may enter and be secured in any suitable manner common to boiler practice, but preferably be welded integrally with the mud-ring, which may be accomplished through suitable openings or orifices 25 arranged in the bottom side of the longitudinal hollow sections opposite to each tube-end, as very clearly shown in Figs. 1, 3, and 5. The openings or orifices 25 arranged in the bottom surface of the mud-ring, may be closed in any suitable manner, preferably by the use of threaded plugs 26, as shown in the drawings. The front and back heads of the fire-box convey ample water to the longitudinal hollow sections of the mud-ring 21 to supply the circulating water through the water tubes 22. The upper or crown surface of the fire-box is formed or provided with three drums or headers 27, 27, 27, see Fig. 4, with which the water tubes 22 communicate. As very clearly shown in Fig. 4, the water tubes 22 are arranged in series, that is, those water tubes which form the side walls of the fire-box alternately enter the side drum and the central drum, while the water tubes forming the central wall of the fire-box alternately enter the side drums. As is clearly apparent, this construction permits the water tubes 22 to form an open lattice work over the crown or top of the fire-box through which the hot gases circulate and impinge against the bottom half of each of the top drums or headers 27, thus forming an exceptionally large and efficient fire-box or combustion chamber heating surface, which is quite a desideratum in locomotive fire-boxes. The water tubes 22 are all preferably provided with a double reverse bend as shown at 22$^a$ and 22$^b$, see Fig. 4, in order to give the least possible strain on the tubes due to unequal expansion and contraction. The water tubes 22 may be secured in the drums or headers 27 in any approved manner but preferably by welding them integrally. The top headers or drums 27 are preferably in the nature of tubes or cylinders extending throughout the entire length of the fire-box from the flue-sheet to the door-sheet, as very clearly shown in Figs. 1 and 3; and it is preferable to provide each of the headers or drums with an opening in the upper surface thereof which is normally closed by cover plates 28, 28, 28, which may be secured to the drums or headers in any approved manner, as for example by rivets 29, see Figs. 1 and 3. The cover plates 28 are secured in place, preferably, after the water tubes 22 have all been secured in the drums or headers 27. This method of forming the top headers or drums 27 is especially desirable when the water tubes 22 are welded in the drums or headers, as the welder or operator can remain outside of the drums or headers and operate his torch through the top opening of the drums, and thus avoid working in close quarters and in the intense heat caused by the welding flame or arc. The top drums or headers have their forward ends properly secured in the flue-sheet 13 and, of course, are open to the water space of the boiler, while the rearward ends of the top drums or headers 27 are properly secured to the fire-door sheet 30, as very clearly shown in Fig. 3, the rear ends of the drums 27 opening into the water leg formed intermediate of the fire-door sheet 30 and the back head 31; the back head 31 and fire-door sheet 30 are properly stayed together by stay bolts 32, see Fig. 3. The door-sheet and the back head close a water space through which free circulation between the top drums 27 and the mud-ring 21, which constitutes the bottom headers, may take place. The back head 31 and the fire-door sheet 30 are shown separated by a calking strip 33 and are secured together by the rivets 44, see Fig. 3, in a manner similar to that used between the flue and throat sheets at the front end of the fire-box, and as hereinbefore set forth. The back head 31 is provided with drum heads 34, 34, 34, arranged immediately opposite the rear ends of the drums or headers 27. These drum heads 34 are shown secured by the stud bolts 35 which screw into the reinforcing rings 36 arranged about the openings in the back head as very clearly shown in Fig. 3; the drum heads and rings being so formed as to provide a water tight connection. It is apparent from this construction, that access to the drums or heads may be readily had through the removal of the drum heads 34, thus permitting light repair work on the water tubes 22 being made by simply removing the drum heads 34 and thus permitting access to the drum desired. Of course, where a general renewal of the water tubes 22 is contemplated, the cover plates 28 of the water heads or drums are preferably removed until the water tubes have been replaced and properly secured in position.

Where the construction shown in the first figures of the drawings is employed, namely where the fire-box is provided with a central wall of water tubes, the back head of the fire-box is provided with two fire-doors 37, see Fig. 2, in order that proper access to both portions of the firebox on opposite sides of the longitudinal line thereof may be had. As the water heads or drums 27 do not entirely cover the upper portion of the fire-box, the spaces intermediate of the sides and central drums are provided with a fire-brick lining 38, see Fig. 4, which is shown held in place by the curved surfaces of the adjacent cylinders or drums. The space to the outside of the side drums or heads 27 and the upper ends of the water tubes 22 is enclosed by a fire-brick lining 39, which is properly held in place by suitable brackets 40 secured to the flue-sheet and to the door-sheet at both sides of the fire-box, see Figs. 1 and 4; the upper ends of the fire-brick may be held in place against the upper ends of the side water tubes by suitable brackets as shown at 41, see Figs. 1 and 4, which brackets may be properly secured to the side water drums or heads 27. The fire-brick lining 39 may be made to extend down from the drums to any desired extent. In order that ready access may be had to the brick lining 39, adjacent the upper ends of the side water tubes, the wrapper sheet 42 may be provided with the side plates 43 secured in place so as to permit the plates to be readily removed in order that repair or renewal of the fire-brick may be easily made; the side plates being clearly shown in Fig. 4; and the cover 42 and plates 43 are shown reinforced by angle irons 42$^a$, 42$^b$, and 43$^a$ and 43$^b$.

It is clearly apparent, from the construction shown and described, that free circulation of the water may be had between the top drums or headers 27 and the headers of the mud-ring formed by the longitudinal portions of the mud-ring by means of the front and rear water legs and by means of the water tubes 22 whereby the water may circulate between the side water heads of the mud-ring and the central top drum or water head as well as the top drum or water head arranged on the same longitudinal side of the fire-box, and that circulation may be had in the central water head of the mud-ring and the two drums or water heads arranged at the sides in the upper portion of the fire-box: that is, each alternate water tube leading from the side water heads of the mud-ring alternately communicate with the central water head or drum and the side water head or drum, arranged on the same side of the fire-box and in the upper portion thereof, while each alternate water tube extending from the central water head of the mud-ring communicates with the water head or drum arranged on opposite sides of the central water head or drum. In carrying out this method of arrangement of the water tubes, it is preferable to stagger the points of communication or connection between the boiler tubes and the water heads of the mud-ring; the staggered manner of connection being very clearly shown in Figs. 4 and 5, thus permitting a suitable bridge or metal portion to remain in the mud-ring intermediate of the ends of the water tube connections; thus also permitting a greater number of water tubes being connected to the respective water heads of the mud-ring as is readily apparent.

Figure 5:
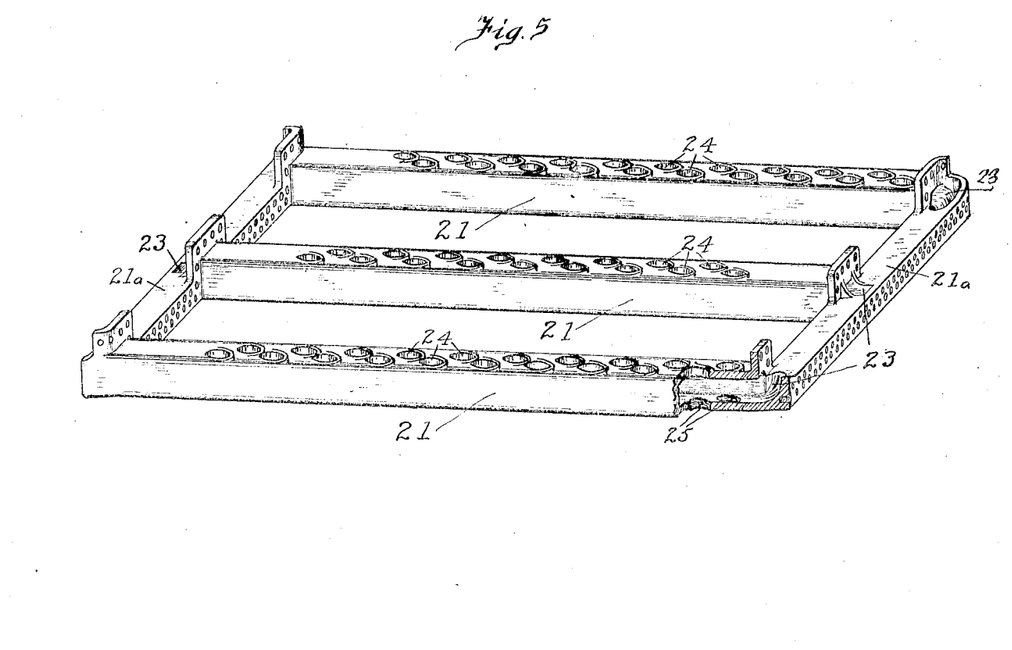
Fig. 5 is a perspective view of the partly hollow mud-ring which forms the bottom headers, a portion being shown in section to more clearly reveal the manner of construction.

The mud-ring 21 has its longitudinal hollow portion connected by the solid transverse portion 21$^a$; these transversely extending portions 21$^a$ merely having openings 23 arranged at the ends of the longitudinally extending hollow portions of the mud-ring, as very clearly shown in Fig. 5.

Figure 6:
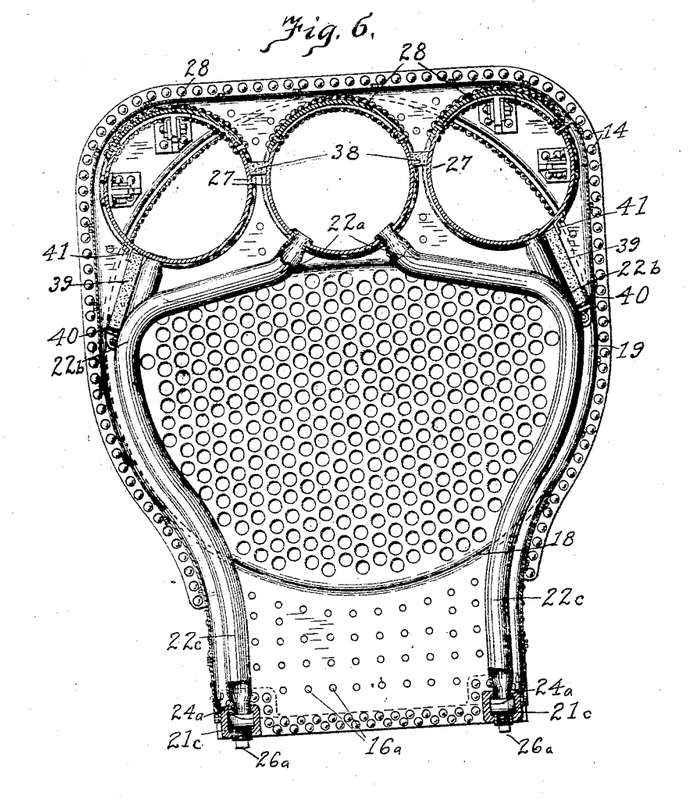
Fig. 6 is a vertical sectional end elevation of a modified form of the invention, illustrating its application to an ogee type of locomotive fire-box, with portions of the tubular connections being shown in section.

In Fig. 6, a modified form of the invention is shown wherein it is shown applied to the ogee style of fire-box. By reason of the limited grate area in a fire-box of this style, it is preferable to omit the middle wall or set of water tubes, because it would make the grate area too small if divided into two halves longitudinally of the fire-box. The construction shown, however, makes a very desirable fire-box as it gives a greater heating surface than may be secured in the ordinary fire-box of this type, as well as providing a less expensive and much safer construction aside from a much more efficient one. In this construction, the upper portion of the fire-box is provided with the three water heads or drums 27, 27, 27, identical in construction with those previously shown and described, extending from the flue-sheet to the door-sheet; with the upper surfaces of the drums or heads 27 provided with openings closed by the cover plates 28, properly secured or riveted thereto. The space intervening the drums or water-heads is closed by the fire-brick 38, in a manner similar to that shown in Fig. 4; while the space at the upper end of the side tubes and to the lower side of the side drums is closed by the fire-brick 39, held in place by suitable brackets 40 and 41. In this construction, the mud-ring 21ᶜ is not provided with the central longitudinally extending water-head, but is merely provided with the two side longitudinally extending portions connected together with the solid transversely extending end portions. The upper surface of the mud-ring is provided with the openings 24ª; and the lower ends of the water tubes 22ᶜ are secured in these openings. As in the previous constructions, each alternate tube connects with the central head or drum at the top and with the side drum or head arranged on the same longitudinal side of the fire-box, as is very clearly shown in the figure. The under surface of the longitudinal side portions of the mud-ring are provided with openings arranged to register with the openings in the upper surface thereof, and these openings are closed by suitable threaded plugs 26ª. In this construction, the water tubes 22ᶜ are shown swaged and rolled and beaded into the mud-ring and into the top drums or headers instead of employing the method shown in the previous figures of the application, thus illustrating the various ways of securing the water tubes to the respective headers. The back head of the fire-box, as in the construction shown in the previous figures, is also provided with openings registering with the rear ends of the upper drums or heads 27, which openings are closed by similar drum heads 34 whereby an effective water tight connection may be formed and ready access to the interior of the drums had. It is evident from the construction shown and described, that the hot gases in the fire-box or combustion chamber will not only come into contact with the various water tubes but will also contact with the lower surfaces of the water heads or drums, thus providing a very quick and rapidly acting steam generator.

It is not attempted herein to show and describe all forms in which the invention may be embodied, but it will be obvious from the foregoing description and illustrations, that the invention may be readily applied to any style of boiler without, however, departing from the spirit of the invention. It is not to be understood, therefore, that the application is limited to the exact constructions shown and described.

What is claimed is:—

1. A fire-box of the class described, provided with a front and a back fluid containing head, a plurality of top and bottom headers having communication with said front and back fluid containing heads, and fluid conveying means intermediate of the top and bottom headers, said means being arranged in series disposed longitudinally of the fire-box, with alternate portions of said means connecting with a different top header.

2. A fire-box of the class described, provided with a front and a back fluid containing head, a plurality of fluid containing members arranged longitudinally along the upper part of the fire-box, a mud-ring provided with fluid containing chambers arranged in the longitudinally disposed portions of said ring, the ends of the chambers in said mud-ring and the ends of said members being in communication with the fluid containing heads, and fluid conveying tubes intermediate of said members and the chambers of the mud-ring, said tubes being arranged in series disposed longitudinally of the fire-box, with the alternate tube of each series having connection with a different fluid containing member.

3. A fire-box of the class described, provided with a front and a back fluid containing head, a plurality of fluid containing members arranged at the upper part of the fire-box intermediate of the front and back fluid containing head and in communication therewith, a mud-ring the longitudinally disposed portions whereof are provided with fluid containing chambers communicating with the front and the back fluid containing head, a plurality of tubes arranged in series disposed longitudinally of the fire-box so as to form the side walls thereof, said tubes being connected with the chambers of the mud-ring and with the fluid containing members in the upper part of the fire-box with the upper end of each alternate tube connecting with a different member.

4. A fire-box of the class described, provided with a front and a back fluid-containing head, a plurality of fluid-containing members disposed longitudinally along the upper part of the fire-box and communicating with said fluid-containing heads, a mud-ring the longitudinal portions whereof are provided with fluid containing chambers independent of each other and communicating with said front and said rear fluid-containing head, a plurality of fluid conveying tubes intermediat of said members and the chambers of said mud-ring, said tubes being arranged in series disposed longitudinally of the fire-box with each alternate tube connected with a different fluid-containing member, and means whereby access to the chambers of the mud-ring may be had at points coincident with the points of communication between said chambers and the fluid conveying tubes.

5. A fire-box of the class described, provided with a front and a back fluid-containing head, a plurality of fluid-containing members longitudinally disposed in the upper part of the fire-box and establishing communication between the front and the back fluid-containing head, a mud-ring the longitudinally disposed portions whereof are provided with fluid-containing chambers independent of one another, fluid conveying means intermediate of said fluid-containing members and the chambers of the mud-ring, said fluid conveying means being arranged to form the side walls of the fire-box with the alternate portions at the upper ends of said means communicating with a different fluid-containing member, means whereby access to the chambers of the mud-ring may be had through the bottom surface thereof, and means whereby access to the fluid-containing members may be had through the back head of the fire-box.

6. A fire-box of the class described, provided with a front and a back fluid-containing head, a plurality of fluid-containing members arranged along the longitudinal center line and sides of the upper part of the fire-box, said members being independent of one another and having communication at opposite ends with the front and the back fluid-containing head and constituting the main portion of the crown of the fire-box, a mud-ring the longitudinal portions whereof are provided with fluid-containing chambers independent of one another and communicating at their ends with the front and the back fluid-containing heads, and fluid-conveying tubes intermediate of said members and the chambers of the mud-ring, said tubes being arranged in series disposed longitudinally of the fire-box with the upper ends of the tubes provided with a double reverse bend and alternately connecting with a different header.

7. In a fire-box of the class described, a mud-ring provided with hollow longitudinally disposed portions and solid transversely disposed portions, the hollow longitudinal portions being adapted to contain fluid, with the ends of the longitudinally disposed portions being provided with ports adapted to communicate with the water heads of the fire-box.

8. In a fire-box of the class described, a mud-ring provided with hollow longitudinally disposed portions connected by transversely extending solid portions, the upper surfaces of the longitudinally disposed portions being provided with openings communicating with the chambers within, and openings in the lower surfaces of said longitudinally disposed portions arranged in alinement with the openings in the upper surfaces.

9. In a fire-box of the class described, a mud-ring provided with a central and two side longitudinally disposed hollow portions connected together by transversely disposed solid portions, the longitudinally disposed portions being provided with openings in the upper surfaces thereof for establishing communication with the chambers therein, and means whereby access to said chambers may be had.

10. In a fire-box of the class described, a mud-ring having hollow longitudinally disposed portions connected together by solid transversely disposed portions, the upper surfaces of the longitudinal portions being provided with openings whereby communication with the chambers within said portions may be established, the lower surfaces of said longitudinally disposed portions being provided with openings in alinement with those in the upper surfaces, and means removably secured in the openings in the lower surfaces whereby a fluid tight connection may be effected.

11. A fire-box of the class described, provided with a front and a back fluid-containing head, a plurality of fluid-containing members longitudinally arranged in the upper part of the fire-box, a mud-ring provided with longitudinally disposed fluid-containing chambers, said members and the chambers of the mud-ring being in communication with the front and the back fluid-containing heads, and a plurality of fluid conveying means intermediate of said members and the chambers of the mud-ring, said means being arranged in series disposed longitudinally of the fire-box with the one series of said means constituting a central wall of the fire box while the other series constitute the side walls of the fire-box.

12. A fire-box of the class described, provided with a front and a back fluid-containing head, a plurality of fluid-containing members arranged longitudinally in the upper part of the fire-box and communicating at opposite ends with the front and the back fluid-containing heads, a mud-ring having hollow longitudinally disposed portions adapted to contain fluid, the ends of said longitudinal portions having communication with the front and the back fluid-containing heads, and fluid conveying means intermediate of said members and the hollow portions of said mud-ring, said means being arranged along the longitudinal center line and the sides of the fire-box with each alternate portion of said means communicating with a different member in the upper part of the fire-box.

13. A fire-box of the class described, provided with a plurality of fluid-containing headers arranged in the upper part of the fire-box, a plurality of fluid-containing headers in the bottom of the fire-box, and a series of fluid-conveying tubes arranged intermediate of the top and bottom headers, the tubes leading from each bottom header being connected with two top headers.

14. A fire-box of the class described, provided with a plurality of fluid-containing drums or headers arranged in the upper part of the fire-box, a plurality of fluid-containing headers in the bottom of the fire-box, and a series of fluid conveying tubes intermediate of the top and bottom headers, the alternate tube of each bottom header being connected with a different top header.

15. A fire-box of the class described, provided with a central and two side fluid-containing drums or headers in the upper part of the fire-box, a mud-ring provided with fluid containing chambers or headers, and fluid conveying tubes intermediate of the top and bottom headers and arranged in series, the alternate tubes of each series being connected with a different top header.

16. A fire-box of the class described, provided with a central and two side fluid-containing drums or headers in the upper part of the fire-box, a mud-ring provided with fluid-containing chambers extending substantially parallel with the top headers, the top headers and fluid-containing chambers of the mud-ring being independent of one another, and fluid conveying tubes intermediate of the top headers and the chambers of the mud-ring, said tubes being arranged in series with the alternate tubes connected with a different top header.

17. A fire-box of the class described, provided with a central and two side drums or fluid-containing headers arranged longitudinally in the upper part of the fire-box, a mud-ring provided with a central and two side fluid-containing chambers extending longitudinally of the mud-ring, and fluid conveying tubes intermediate of the fluid-containing drums or headers in the upper part of the fire-box and the fluid-containing chambers of the mud-ring, said tubes being arranged in series so as to provide a central and two side walls for the fire-box with the alternate tubes of each series communicating with a different drum or header in the upper part of the fire-box.

18. A fire-box of the class described, provided with a central and two side drums or fluid-containing headers arranged longitudinally in the upper part of the fire-box, a mud-ring provided with fluid-containing chambers in the longitudinal portions thereof, fluid conveying tubes arranged in series so as to constitute the side walls of the fire-box, with the alternate tubes of each mud-ring fluid-containing chamber being connected with a different fluid-containing header in the upper part of the fire-box, and a front and a back fluid head whereby communication between the ends of the top headers and the ends of the mud-ring chambers is established.

19. A fire-box of the class described, provided with a plurality of fluid-containing headers arranged longitudinally in the upper part of the fire-box, a mud-ring the longitudinal portions whereof are provided with fluid-containing chambers, a fluid-containing back chamber formed by the back head and fire door-sheet of the fire-box, said chamber establishing communication between the headers in the upper part of the fire-box and the longitudinally disposed chambers of the mud-ring, and means arranged in alinement with the fluid-containing headers in the upper part of the fire-box whereby access to said headers may be had and a fluid tight connection in the back head of the fire-box obtained.

20. In a fire-box of the class described, provided with top fluid-containing headers, a mud-ring the longitudinal portions whereof are provided with chambers extending lengthwise therethrough, said chambers constituting bottom fluid-containing headers, a front fluid-containing head formed by the throat-sheet and flue-sheet of the fire-box, said head terminating at its forward side in the barrel of the boiler, while the other side of said head communicates with the top and bottom headers.

21. A fire-box of the class described, the throat-sheet and flue-sheet and door-sheet and back sheet constituting front and back water heads respectively, a plurality of drums or headers arranged longitudinally in the upper part of the fire-box with their ends openly communicating with said front and back water heads, a mud-ring the longitudinally extending portions whereof are provided with water chambers having their ends communicating with the front and back water heads, the drums or headers in the upper part of the fire-box and the chambers of the mud-ring being spaced apart and out of direct communication with one another, a plurality of water conveying tubes arranged in series longitudinally of the fire-box whereby circulation between each chamber of the mud-ring and two of the upper drums or headers may be established, and means whereby access to the drums or headers and to the chambers of the mud-ring may be had at points coincident with the ends of the water tubes.

22. A fire-box of the class described, comprising a central and two side longitudinally disposed drums or headers in the upper part of the fire-box and independent of each other, a mud-ring having two sides and a central longitudinally disposed hollow portion forming water containing chambers independent of each other, and a plurality of water conveying tubes arranged in longitudinally disposed series so as to constitute the side walls and a central wall of the fire-box, the series constituting the central wall having the alternate tubes connected with the side drums, while the series constituting the side walls have the alternate tubes connected with the central drum and with the side drum arranged on the same respective side as said series of tubes.

23. A fire-box of the class described, comprising a central and two side drums or headers longitudinally disposed in the upper part of the fire-box and spaced apart with intervening baffle means of non-heat-conducting material, a mud-ring the longitudinal portions whereof are provided with fluid-containing chambers, and water conveying tubes leading from the chambers of the mud-ring to said drums or headers, the tubes being arranged in series and constituting the side walls of the fire-box with the upper ends of the tubes communicating with two of said drums or headers.

24. A fire-box of the class described, comprising a plurality of drums or headers longitudinally disposed in the upper part of the fire-box, a mud-ring the longitudinal portions whereof are provided with fluid-containing chambers, and water conveying tubes arranged in a staggered manner on the longitudinal portions of the mud-ring and establishing communication with the chambers within, said tubes being arranged in series longitudinally throughout the fire-box so as to constitute the side walls thereof, with the alternate tubes of the different series being connected with a different drum or header.

25. A fire-box of the class described, provided with water-heads at both ends of the fire-box, one or more drums or headers longitudinally disposed in the upper part of the fire-box, a mud-ring provided with longitudinally disposed fluid-containing chambers communicating at their ends with the water-heads of the fire-box, and water tubes extending from the chambers of the mud-ring to the header or headers in the upper part of the fire-box.

26. A fire-box of the class described, comprising top and bottom fluid-containing means extending from end to end of the fire-box, said means being open at the ends thereof, water-heads arranged at both ends of the fire-box and in communication with said means, and water tubes vertically disposed between the top and bottom means and in communication therewith, said water tubes being arranged in series with the upper ends disposed to one side of the vertical axes of the tubes and adapted to substantially constitute the crown of the fire-box.

HENRY JACOBS,
*Administrator for estate of Frank M. Jacobs.*

Witnesses:
GEO. W. PENNELL,
S. P. BAKER.